(12) United States Patent
Lee et al.

(10) Patent No.: US 8,519,081 B2
(45) Date of Patent: Aug. 27, 2013

(54) POLYSULFONE POLYMERS AND RELATED POLYMER ELECTROLYTE MEMBRANES AND FUEL CELLS

(75) Inventors: Ju Ho Lee, Incheon (KR); Dong Il Kim, Incheon (KR); Jang-Bae Son, Incheon (KR); Hyung-Su Park, Incheon (KR); Inchul Hwang, Seongnam (KR); Ki Yun Cho, Seoul (KR)

(73) Assignees: Hyundai Motor Company, Seoul (KR); Dongjin Semichem Co., Ltd., Incheon (KR)

( * ) Notice: Subject to any disclaimer, the term of this patent is extended or adjusted under 35 U.S.C. 154(b) by 83 days.

(21) Appl. No.: 12/757,948

(22) Filed: Apr. 9, 2010

(65) Prior Publication Data
US 2010/0261091 A1    Oct. 14, 2010

(30) Foreign Application Priority Data

Apr. 10, 2009 (KR) .................. 10-2009-0031435

(51) Int. Cl.
 *C08G 8/02* (2006.01)
(52) U.S. Cl.
 USPC ........... 528/125; 528/171; 528/295; 528/220; 528/373; 521/27; 429/479; 429/480; 429/429; 429/498; 429/493
(58) Field of Classification Search
 USPC ........... 528/125, 171, 295, 220, 373; 521/27; 429/479, 480, 498, 493, 429
 See application file for complete search history.

(56) References Cited

U.S. PATENT DOCUMENTS

| | | | |
|---|---|---|---|
| 2002/0015875 A1* | 2/2002 | Kim | 429/33 |
| 2004/0137297 A1* | 7/2004 | Matsuoka et al. | 429/30 |
| 2009/0203806 A1* | 8/2009 | Liu et al. | 521/27 |

FOREIGN PATENT DOCUMENTS

CA      2047381    * 7/1991

\* cited by examiner

*Primary Examiner* — Shane Fang
(74) *Attorney, Agent, or Firm* — Edwards Wildman Palmer LLP; Peter F. Corless

(57) ABSTRACT

Polysulfone based polymer comprising a repeat unit represented by the following Chemical Formula 1 is provided:

<Chemical Formula 1>

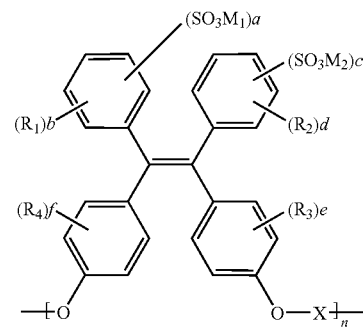

wherein,
X, $M_1$, $M_2$, a, b, c, d, e, f, $R_1$, $R_2$, $R_3$, $R_4$ and n are as defined in the detailed description.

27 Claims, 1 Drawing Sheet

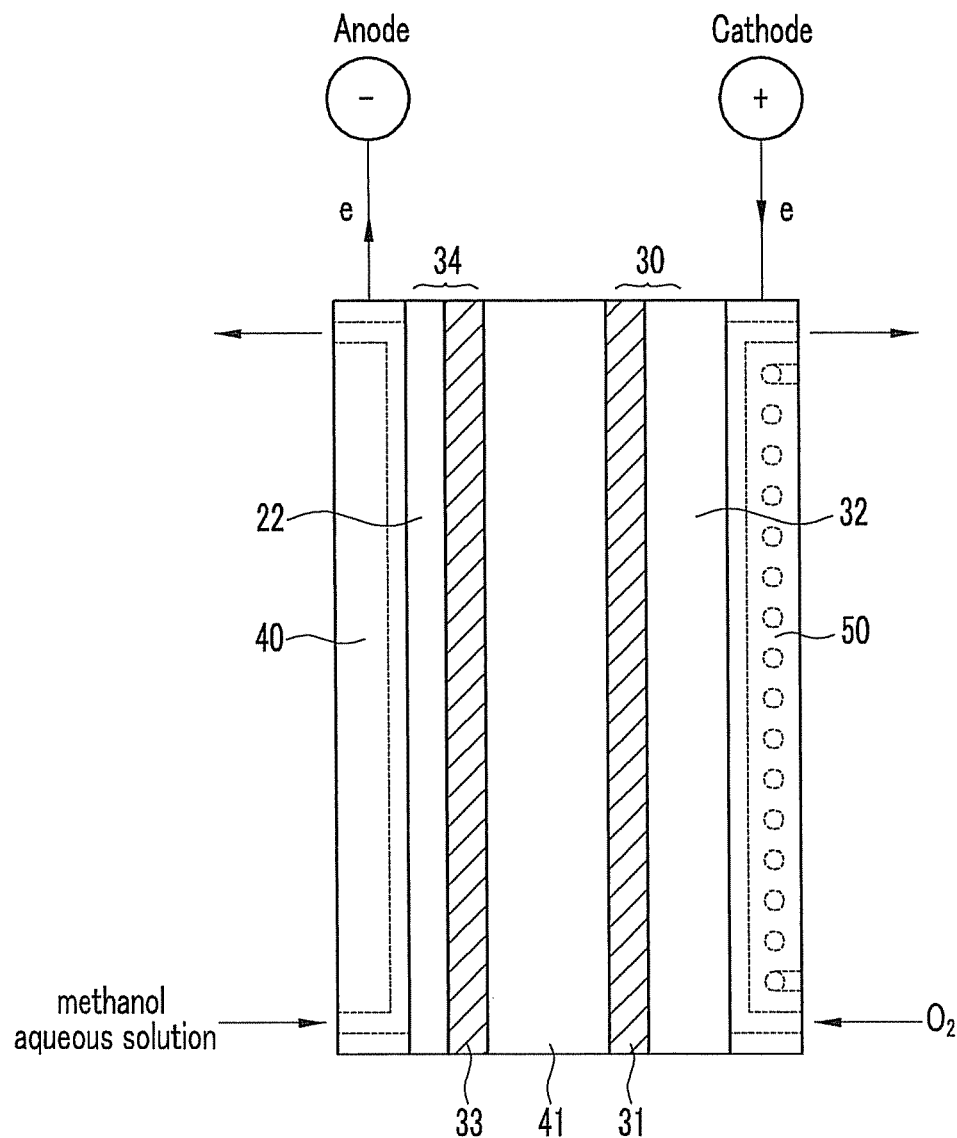

POLYSULFONE POLYMERS AND RELATED POLYMER ELECTROLYTE MEMBRANES AND FUEL CELLS

CROSS-REFERENCE TO RELATED APPLICATION

This application claims priority to and the benefit of Korean Patent Application No. 10-2009-0031435 filed in the Korean Intellectual Property Office on Apr. 10, 2009, the entire contents of which are incorporated herein by reference.

BACKGROUND OF INVENTION

1. Field of the Invention

The present invention relates to polysulfone based polymer, a polymer electrolyte membrane comprising the polymer, a membrane-electrode assembly comprising the membrane, a fuel cell comprising the membrane, and a method for preparing the polymer, particularly to polysulfone based polymer with novel structure, a polymer electrolyte membrane comprising the polymer, a membrane-electrode assembly comprising the membrane, a fuel cell comprising the membrane, and a method for preparing the polymer.

2. Description of the Related Art

A fuel cell can be classified into PEMFC (polymer electrolyte membrane fuel cell), PAFC (phosphoric acid fuel cell), MCFC (molten carbonate fuel cell), SOFC (solid oxide fuel cell), etc. depending on the kinds of electrolyte, and the operation temperature and material quality of components of the fuel cell are varied depending on the kinds of electrolyte.

PEMFC (Polymer Electrolyte Membrane Fuel Cell) can exhibit excellent output, low operation temperature and rapid response properties, compared to other fuel cells.

A fuel cell may contain an electricity generation part where electricity is generated, a reformer, a fuel tank and a fuel pump, etc. The electricity generation part forms a body of the fuel cell, and the fuel pump supplies fuel in the fuel tank to the reformer. Hydrogen gas is generated through the reformer, and fuel is supplied to the electricity generation part by the pump to generate electrical energy by electrochemical reaction. The electricity generation part may include a membrane electrode assembly (MEA) which contains anode, cathode and a polymer electrolyte membrane components.

Fuel cells also can be classified as fuel direct supply or internal reforming fuel cell depending on the fuel supplying method, and DMFC (direct methanol fuel cell) is representative of a fuel direct supply fuel cell.

Since the direct methanol fuel cell uses a polymer electrolyte membrane as electrolyte, it can be classified as a polymer electrolyte type fuel cell.

The direct methanol fuel cell does not use hydrogen reformer, etc. because it employs methanol as fuel It can be operated at low temperature, and thus it can provide a simple and compact system suitable for electric power of small devices and portables.

Electricity generation in the direct methanol fuel cell can be provided as follows: Methanol is supplied to the anode electrode and decomposed into proton, electron and $CO_2$ by oxidation reaction of electrode catalyst, and proton is transferred to cathode through the polymer electrolyte membrane and electron is transferred to cathode through external circuit. In the cathode, oxygen flowing from the air, electron transferred through the external circuit, and proton transfers through the membrane react to produce water. The electrochemical reaction is represented by the following Reaction Formula 1:

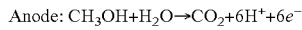

Anode: $CH_3OH + H_2O \rightarrow CO_2 + 6H^+ + 6e^-$

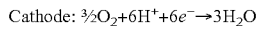

Cathode: $\tfrac{3}{2}O_2 + 6H^+ + 6e^- \rightarrow 3H_2O$

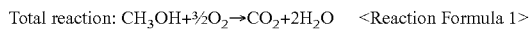

Total reaction: $CH_3OH + \tfrac{3}{2}O_2 \rightarrow CO_2 + 2H_2O$   <Reaction Formula 1>

As the electrolyte membrane of the polymer electrolyte type fuel cell, a functional proton exchange membrane capable of cation exchange can be used. In commercial applications, a proton exchange membrane comprising sulfonic acid group is frequently employed. Sulfonic acid is strongly acidic and the C—S bond is stable even under oxidation conditions. In order to maintain proton conductivity high in the proton exchange membrane comprising sulfonic acid functionality, water molecules also should be present. In the presence of water molecules, a sulfonic acid functionality existing in the electrolyte membrane is dissociated into sulfonate anion and proton, and the proton is transferred by proton concentration gradient or electric field as in sulfuric acid solution electrolyte. Proton conductivity can be influenced by the number of sulfonic acid groups present in the polymer electrolyte membrane, structure of the polymer electrolyte membrane, and the amount of water contained in the polymer electrolyte membrane, etc.

A typical current polymer electrolyte type fuel cell is a fluorine containing polymer electrolyte membrane such as Nafion membrane, Aciplex membrane, Flemion membrane or Dow membrane. The fluorine containing polymer electrolyte membranes has deteriorated proton conductivity at high temperature of 100□ or more, high fuel gas permeability, and is expensive. And, as proton conductivity increases, water permeability of the polymer electrolyte membrane increases, thereby increasing permeability of fuel (for example, methanol). Thus, it is difficult to simultaneously have high proton conductivity and low fuel permeability.

Accordingly, there is a demand for improved polymer electrolyte membranes, particularly polymer electrolyte membranes having low preparation cost, high proton conductivity, and/or low fuel permeability.

The above information dclose din this Background section is only for the enhancement of understanding of the background of the invention and therefore it may contain information that does not form prior art that is already known.

SUMMARY OF THE INVENTION

One aspect of the invention provides new polysulfone polymers.

Another aspect of the invention provides a polymer electrolyte membrane comprising a polymer as disclosed herein.

Another aspect of the invention provides a membrane-electrode assembly comprising the polymer electrolyte membrane.

Another aspect of the invention provides a fuel cell comprising a polymer electrolyte membrane.

Another aspect of the invention provides a vehicle that comprises a fuel cell that comprises a polymer electrolyte membrane as disclosed herein.

Another aspect of the invention provides a process for preparing a polysulfone polymer as disclosed herein.

According to one aspect of the invention, a polysulfone polymer comprising a repeat unit represented by the following Chemical Formula 1 is provided:

<Chemical Formula 1>

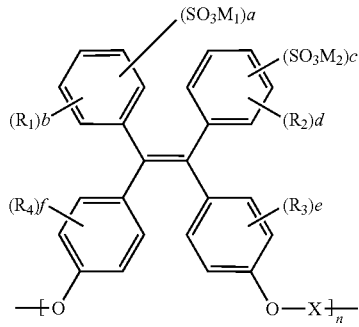

wherein,

X is a single bond or $Ar_1$, and $Ar_1$ is substituted or unsubstituted C6-20 arylene group;

$M_1$ and $M_2$ are independently hydrogen or an inorganic cation such as lithium, sodium or potassium;

a+b=5, c+d=5, a and c are independently an integer of from 1 to 5;

e and f are independently an integer of from 0 to 4;

$R_1$, $R_2$, $R_3$ and $R_4$ are independently hydrogen, C1-20 linear or branched alkyl, C2-20 alkenyl, C2-20 alkynyl, C5-20 cycloalkyl, C6-20 aryl, C2-20 heteroaryl, C7-20 alkylaryl, or C1-20 alkoxy group; and, n, which is a polymerization degree, is 10 to 10,000.

According to another aspect of the invention, a polymer electrolyte membrane comprising the polymer is provided.

According to another aspect of the invention, a membrane-electrode assembly comprising the polymer electrolyte membrane is provided.

According to another aspect of the invention, a fuel cell comprising the polymer electrolyte membrane is provided.

According to another aspect of the invention, provided is a process for preparing the polysulfone based copolymer comprising:

reacting compounds represented by the following Chemical Formulae 5 to 7 to prepare a compound represented by the following Chemical Formula 8; and sulfonating the compound represented by the following Chemical Formula 8 to prepare a compound represented by the following Chemical Formula 3:

<Chemical Formula 3>

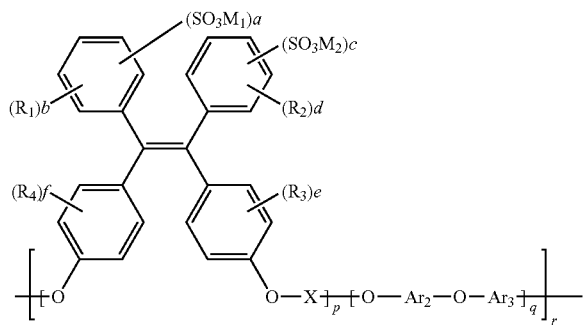

<Chemical Formula 5>

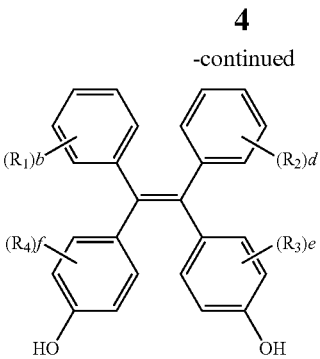

<Chemical Formula 6>

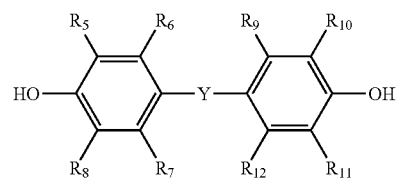

<Chemical Formula 7>

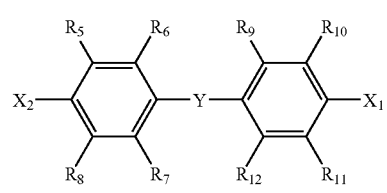

<Chemical Formula 8>

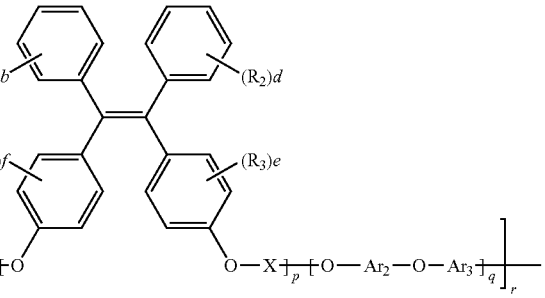

wherein,

X is a single bond or $Ar_1$, $Ar_1$, $Ar_2$ and $Ar_3$ are substituted or unsubstituted C6-20 arylene;

$M_1$ and $M_2$ are independently hydrogen, lithium, sodium, or potassium;

a and c are independently an integer of from 1 to 5;

b and d are independently an integer of from 1 to 4;

a+b=5, c+d=5;

e and f are independently an integer of from 0 to 4, $R_1$, $R_2$, $R_3$ and $R_4$ are independently C1-20 linear or branched alkyl, C2-20 alkenyl, C2-20 alkynyl, C5-20 cycloalkyl, C6-20 aryl, C2-20 heteroaryl, C7-20 alkylaryl, or C1-20 alkoxy;

$R_5$, $R_6$, $R_7$, $R_8$, $R_9$, $R_{10}$, $R_{11}$ and $R_{12}$ are independently hydrogen, halogen atom, —$SO_3M$ (M is hydrogen, or alkali metal or other inorganic cationic species), C1-20 linear or branched alkyl, C2-20 alkenyl, C2-20 alkynyl, C5-20 cycloalkyl, C6-20 aryl, C2-20 heteroaryl, C7-20 alkylaryl, or C1-20 alkoxy group; and, Y is a single bond, S, $S(=O)_2$, $C(=O)$, $P(=O)(R_{17})$ or $C(R_{18})(R_{19})$, and $R_{17}$, $R_{18}$, $R_{19}$ are independently C1-20 alkyl or C6-20 aryl unsubstituted or substituted with halogen.

According to one aspect of the invention, the fuel cell using the polymer electrolyte membrane comprising the novel polysulfone based polymer has improved properties such as proton conductivity, gas permeability, etc.

In other preferred aspects, each of the substituents of the above Chemical Formulae 1 through 8 may be substituted in one or more available positions by one or more non-hydrogen substituents.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or omore sources of power, for example both gasoline powered and electric powered vehicles.

Other aspects of the invention are disclosed infra.

BRIEF DESCRIPTION OF THE DRAWINGS

FIG. 1 is a schematic diagram of a direct methanol fuel cell according to one embodiment of the present invention.

DETAILED DESCRIPTION OF THE INVENTION

As discussed above, the present invention includes polysulfone based polymers, a polymer electrolyte membrane comprising the described polymers, a membrane-electrode assembly comprising the membrane, a fuel cell comprising the membrane, a vehicle (including hybrid vehicles) comprising a polymer membrane and fuel cell as disclosed herein, and a process for preparing the polymer according to one embodiment of the invention are described in detail.

A preferred polymer sulfone based polymer according to one embodiment of the invention comprises a repeat unit represented by the following Chemical Formula 1:

<Chemical Formula 1>

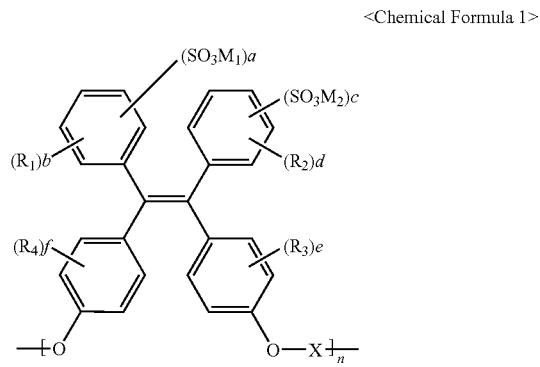

Wherein,
X is a single bond or $Ar_1$, and $Ar_1$ is substituted or unsubstituted C6-20 arylene group;
$M_1$ and $M_2$ are independently hydrogen or inorganic cation species such as lithium, sodium or potassium;
a+b=5, c+d=5, a and c are independently an integer of from 1 to 5;
e and f are independently an integer of from 0 to 4;
$R_1$, $R_2$, $R_3$ and $R_4$ are independently hydrogen, C1-20 linear or branched alkyl, C2-20 alkenyl, C2-20 alkynyl, C5-20 cycloalkyl, C6-20 aryl, C2-20 heteroaryl, C7-20 alkylaryl, or C1-20 alkoxy group; and,
n, which is a polymerization degree, is 10 to 10,000.

The grounds of excellent properties of the polysulfone based polymer are concretely explained, but it is only to assist understanding of the invention and is not intended to limit the scope of the invention in any manner.

The sulfonic acid group in the polymer is preferably connected at one end of the branch. Because the sulfonic acid group is connected at one end of the polymer branch, it can be spaced from the main chain and move comparatively freely. The sulfonic acid group connected to the branch can function as a surfactant in the polymer. Thus, the sulfonic acid group at the end of the branch can easily form an ion channel such as micelle, and it can control the size of the ion channel by controlling the position where the sulfonic acid group is connected to the branch. Consequently, the polysulfone based polymer can easily control the amount of water contained in the ion channel and it may have high proton conductivity.

In the existing polysulfone based polymer, sulfonic acid group is directly connected to the main chain, and thus, if the content of the sulfonic acid group increases in the polymer, the polymer itself may be dissolved in water and exhibit reduced function as an electrolyte membrane, thereby limiting the content of the sulfonic acid group. Therefore, the existing polysulfone based copolymer wherein sulfonic acid group is connected only to the main chain may not have high proton conductivity, and methanol permeation through the main chain may easily occur.

However, in the present preferred materials, because the sulfonic acid group is spaced from the main chain in the polymer of the present invention, hydrophilic and hydrophobic portions are separated in the copolymer thus further inhibiting methanol permeation through the main chain of a hydrophobic part. And, because the sulfonic acid group does not exist at the main chain and instead is present at a polymer branch, flexibility of the polysulfone based polymer itself may be improved, and heat stability, oxidation/reduction stability may be improved.

The term "substituted" herein means, unless otherwise defined, a koiety that is substituted by non-hydrogen groups such as substituted with halogen, C1-20 alkyl, C2-20 alkenyl, C2-20 alkynyl, C5-20 cycloalkyl, C6-20 aryl, C2-20 heteroaryl or combinations thereof.

As referred to herein a C6-20 arylene group is a monovalent functional group comprising an aromatic ring system, and it may suitably comprise 2 or more ring systems, and the 2 or more ring systems may be bonded or fused with each other. For example, the 2 or more ring systems may be connected by a single bond.

As referred to herein, an alkyl group is a monovalent hydrocarbon functional group consisting only of carbon and hydrogen wherein the carbon is connected only by a single bond. For example, it may include methyl, ethyl, butyl, isobutyl, tert-butyl, pentyl, hexyl group, etc.

As referred to herein, an alkenyl group is a monovalent hydrocarbon functional group comprising one or more carbon-carbon double bonds in the chain. For example, it may include vinyl, allyl group, etc.

As referred to herein, an alkynyl group is a monovalent hydrocarbon functional group comprising one or more carbon-carbon triple bonds in the chain.

As referred tro herein, a cycloalkyl group is an alkyl group wherein carbon chain forms a ring. For example, it may include cyclopentyl, cyclohexyl group, etc.

As referred to herein, a heteroaryl group is a functional group wherein one or more carbons of the aryl group are substituted with one or more selected from the group N, O, S and P.

According to another embodiment of the invention, the polymer may be a copolymer further comprising a repeat unit represented by the following Chemical Formula 2:

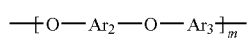
<Chemical Formula 2>

Wherein, $Ar_2$ and $Ar_3$ are independently substituted or unsubstituted C6-20 arylene group; and, m, which is a polymerization degree, is 10 to 10,000.

According to another embodiment of the invention, the polymer may be a copolymer comprising a repeat unit represented by the following Chemical Formula 3:

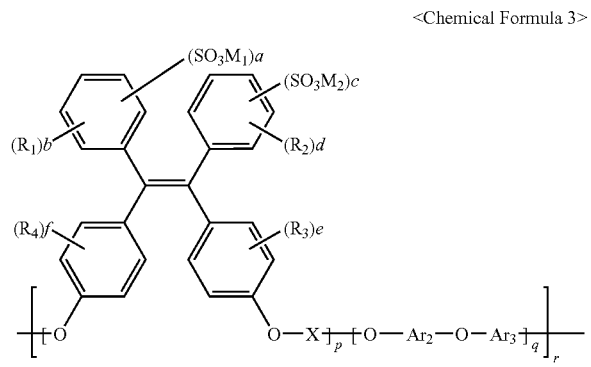
<Chemical Formula 3>

Wherein, X, $M_1$, $M_2$, $R_1$, $R_2$, $R_3$, $R_4$, a, b, c, d, e, f are as defined above, $Ar_2$ and $Ar_3$ are independently substituted or unsubstituted C6-20 arylene group; p and q are mole fraction, and p+q=1, 0<p<1, 0<q<1; and, r, which is a polymerization degree, is 10 to 10000.

According to another embodiment of the invention, the substituted or unsubstituted C6-20 arylene group in the polymer may be represented by one of the following Chemical Formulae:

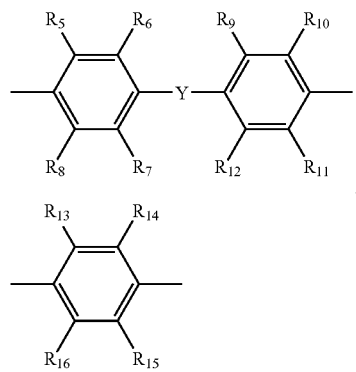
<Chemical Formula 1a>
<Chemical Formula 1b> wherein, $R_5$, $R_6$, $R_7$, $R_8$, $R_9$, $R_{10}$, $R_{11}$, $R_{12}$, $R_{13}$, $R_{14}$, $R_{15}$ and $R_{16}$ are independently hydrogen, halogen atom, C1-20 linear or branched alkyl, C2-20 alkenyl, C2-20 alkynyl, C5-20 cycloalkyl, C6-20 aryl, C2-20 heteroaryl, C7-20 alkylaryl, or C1-20 alkoxy group; Y is a single bond, S, S(=O)$_2$, C(=O), P(=O)($R_{17}$) or C($R_{18}$)($R_{19}$); $R_{17}$, $R_{18}$, $R_{19}$ are independently C1-20 alkyl or C6-20 aryl group unsubstituted or substituted with halogen.

According to another embodiment of the invention, the arylene group represented by the above Chemical Formula 1a and 1b in the polymer may further comprise —$SO_3M$ (M is hydrogen, or alkali metal or other inorganic species) as substituent. In general, the arylene group does not contain sulfonate group, but if necessary according to the use, the arylene group may be substituted with one or more of the sulfonate group.

According to another embodiment of the invention, the polymer may be a copolymer comprising a repeat unit represented by the following Chemical Formula 4:

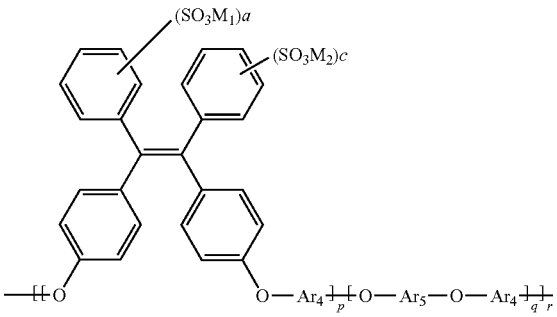
<Chemical Formula 4>

Wherein, X, $M_1$, $M_2$, a, and c are as defined above; $Ar_4$ and $Ar_5$ are independently substituted or unsubstituted C6-20 arylene; p and q are mole fraction, and p+q=1, 0<p<1, 0<q<11 and, r, which is a polymerization degree, is 10 to 10000.

According to another embodiment of the invention, in the copolymer comprising the repeat unit represented by the above Chemical Formula 4, the polymerization degree r is preferably 20 to 100, which is appropriate for achieving the object of the invention.

According to another embodiment of the invention, the $Ar_4$ or $Ar_5$ in the polymer is preferably C6-20 arylene group represented by one of the following Chemical Formulae:

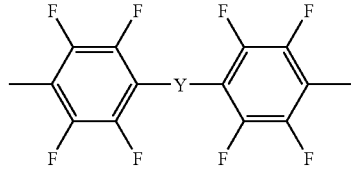
<Chemical Formula 4a>

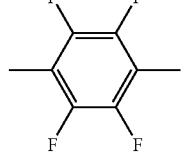
<Chemical Formula 4b>

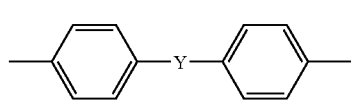
<Chemical Formula 4c>

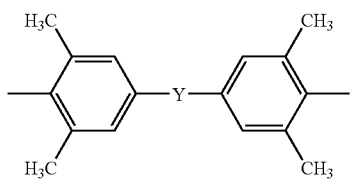

<Chemical Formula 4d> wherein, Y is independently a single bond, S, S(=O)$_2$, C(=O), P(=O)(R$_{17}$) or C(R$_{18}$)(R$_{19}$); R$_{17}$, R$_{18}$, R$_{19}$ are independently C1-20 alkyl or C6-20 aryl group unsubstituted or substituted with halogen.

According to another embodiment of the invention, in the copolymer represented by the above Chemical Formula 3 or 4, the ratio of the p and q is preferably 1:9 to 9:1, which is appropriate for achieving the object of the invention.

According to another embodiment of the invention, the polymer represented by one of the above Chemical Formulae 1 to 4 preferably has weight average molecular weight of 1,000 to 500,000, more preferably 1,000 to 100,000.

According to another embodiment of the invention, the copolymer represented by one of the above Chemical Formulae 2 to 4 is random copolymer or block copolymer, preferably block copolymer. The block copolymer can be more suitable for use as an electrolyte membrane.

According to another embodiment of the invention, a polymer electrolyte membrane comprising the polysulfone based polymer is provided. Because the polymer electrolyte membrane comprises polysulfone based polymer represented by one of the above Chemical Formulae 1 to 4, it has low methanol permeability and high proton conductivity, and excellent moisture content property.

And, the polymer electrolyte membrane comprising the polymer may have heat stability and chemical stability of general poly(arylene ether) based polymer, and it can be easily processed and has low moisture absorption, thus can be used as thermoplastic polymer, membrane elastomer, etc., and it may have high proton conductivity even at low moisture content due to inclusion of sulfonic acid group, it does not show change in electrolyte membrane properties even if exposed to moisture for extended time periods, thus exhibiting high dimensional stability, and therefore, it is suitable for use as a fuel cell or secondary battery, etc. due to its excellent performance as a polymer electrolyte membrane.

According to another embodiment of the invention, the polymer electrolyte membrane preferably has proton conductivity of $0.5 \times 10^{-3}$ S/cm or more at relative humidity of 100% and 25° C., more preferably $1 \times 10^{-3}$ S/cm or more, most preferably $3 \times 10^{-3}$ S/cm to $200 \times 10^{-3}$ S/cm.

According to another embodiment of the invention, the polymer electrolyte membrane preferably has methanol permeability of $20 \times 10^{-7}$ cm$^2$/s or less at relative humidity of 100% and 25° C., more preferably $10 \times 10^{-7}$ cm$^2$/s or less, most preferably $8 \times 10^{-7}$ cm$^2$/s to $0.01 \times 10^{-7}$ cm$^2$/s.

According to another embodiment of the invention, the polymer electrolyte membrane may further comprise polyimide, polyetherketone, polysulfone excepting the polymer of one of the Chemical Formulae 1 to 4, polyethersulfone, polyetherethersulfone, polybenzimidazole, polyphenylene oxide, polyphenylene sulfide, polystyrene, polytrifluorostyrene sulfonic acid, polystyrene sulfonic acid, polyurethane, branched sulfonated polysulfoneketone copolymer, or a mixture thereof.

According to another embodiment of the invention, the polymer electrolyte membrane may further comprise silicon oxide (SiO$_2$), titanium oxide (TiO$_2$), inorganic phosphoric acid, sulfonated silicon oxide (Sulfonated SiO$_2$), sulfonated zirconium oxide (sulfonated ZrO), sulfonated zirconium phosphate (sulfonated ZrP) or a mixture thereof as inorganic substances. The inorganic substance functions as a barrier to a channel through which proton and methanol are permeated, thus decreasing fuel permeability of the polymer electrolyte membrane.

According to another embodiment of the invention, the polymer electrolyte membrane may further comprise a porous support. The inclusion of the porous support may improve tensile strength of the polymer electrolyte membrane. The porous support may include porous polyolefin such as porous polyethylene, porous Teflon, porous polyimide, etc.

According to another embodiment of the invention, a membrane-electrode assembly and a fuel cell comprising the polymer electrolyte membrane are provided. The membrane-electrode assembly comprises cathode, anode, and a polymer electrolyte membrane according to one embodiment of the invention interposed therebetween. And, the fuel cell may further comprise a separation plates respectively attached to both sides of the membrane-electrode assembly comprising the polymer electrolyte membrane according to one embodiment of the invention. If necessary, a reformer, a fuel tank, a fuel pump, etc. may be selectively added to the separation plate. And, the fuel cell may comprise plurality of the membrane-electrode assemblies.

The cathode and anode are consisted of a gas diffusion layer and a catalyst layer. The catalyst layer comprises a metal catalyst which promotes oxidation of hydrogen and reduction of oxygen. The catalyst layer preferably comprises one or more selected from the group consisting of platinum, ruthenium, osmium, platinum-osmium alloy, platinum-palladium alloy, and platinum-M alloy (M is Ga, Ti, V, Cr, Mn, Fe, Co, Ni, Cu, or Zn). It is preferable to comprise platinum, ruthenium, osmium, platinum-ruthenium alloy, platinum-osmium alloy, platinum-palladium alloy, platinum-cobalt alloy, platinum-nickel alloy or a mixture thereof.

The metal catalyst is generally suitably supported by a support. The support may include carbonaceous material such as acetylene black, graphite; or inorganic particulate such as alumina, silica. For example, the support for the catalyst may be porous and have surface area of 150 m$^2$/g or more, particularly 500 to 1200 m$^2$/g, and average diameter of 10 to 300 nm, particularly 20 to 100 nm.

As the gas diffusion layer, a carbon paper or carbon cloth may be used, but not limited thereto. The gas diffusion layer functions for supporting an electrode for fuel cell, and diffusing reaction gas to the catalyst layer to allow easy access of the reaction gas to the catalyst layer. As the gas diffusion layer, a carbon paper or a carbon cloth that is water repellent treated with fluorine containing resin such as polytetrafluoroethylene may be preferably used. The water repellent treated carbon paper or carbon cloth can prevent deterioration of gas diffusion efficiency due to water generated when operating the fuel cell.

The electrode may further comprise a microporous layer in order to further improve gas diffusion between the gas diffusion layer and the catalyst layer. The microporous layer may be prepared by coating a composition comprising conductive material such as carbon powder, carbon black, active carbon, acetylene black, etc., a binder such as polytetrafluoroethylene, and if necessary, ionomer.

The cathode and/or anode may be prepared as follow. First, catalyst powder, a binder and a mixed solvent are mixed to prepare catalyst slurry. The catalyst powder may be a metal particle supported by a carbonaceous support, or metal particle that is not supported by a carbonaceous support, preferably platinum. The mixed solvent and the binder are not specifically limited as long as it can be generally used in the corresponding technical field. Next, the catalyst slurry is coated on the gas diffusion layer using a coater and dried to prepare cathode and/or anode consisting of a catalyst layer and a gas diffusion layer.

Between the cathode and the anode, the polymer electrolyte membrane according to one embodiment of the invention is interposed and compressed by hot pressing to obtain a membrane-electrode assembly. Conditions for the hot pressing may include pressure of 500 to 2000 psi, temperature of 50 to 300° C., pressurization time of 1 to 60 minutes.

A separation plate is added to the membrane-electrode assembly to obtain an electricity generation part. The separation plates are attached respectively to both sides of the membrane-electrode assembly, and the separation plate attached to the anode is an anode separation plate and the separation plate attached to cathode is a cathode separation plate. The anode separation plate has a flow channel for supplying fuel to anode, and functions as electronic conductor for transferring electrons generated at the anode to external circuit or adjacent unit cell. The cathode separation plate has a flow channel for supplying oxidant to the cathode, and functions as electronic conductor for transferring electrons supplied from external circuit or adjacent unit cell to the cathode. Next, at least one of a reformer, a fuel tank, a fuel pump, etc. are selectively added to the electricity generation part to complete a fuel cell.

According to another embodiment of the invention, the fuel cell may be a direct methanol fuel cell. The direct methanol fuel cell is schematically shown in FIG. 1.

As shown in FIG. 1, the direct methanol fuel cell includes anode (34) to which fuel is supplied, cathode (30) to which an oxidant is supplied, and an electrolyte membrane (41) positioned between the anode (34) and the cathode (30). The anode (34) includes an anode diffusion layer (22) and an anode catalyst layer (33), and the cathode (30) includes a cathode diffusion layer (32) and a cathode catalyst layer (31).

A methanol aqueous solution transferred to the anode catalyst layer (33) through the anode diffusion layer (22) is decomposed into electron, proton, carbon dioxide, etc. by the catalyst. The proton is transferred to the cathode catalyst layer (31) through the electrolyte membrane (41), and the electron is transferred to the external circuit, and the carbon dioxide is discharged outside. In the cathode catalyst layer (31), proton transferred through the electrolyte membrane, electron supplied from the external circuit and oxygen in the air supplied through the cathode diffusion layer (32) are reacted to produce water. However, the polymer electrolyte membrane comprising the polymer according to one embodiment of the invention can be used for other kinds of fuel cells.

According to another embodiment of the invention, the fuel cell may be a fuel cell for vehicle. The vehicle may include vehicles of all purposes including transport vehicles such as automobile, truck, etc, vehicles of other purposes such as excavator, forklift, etc. The constitution and output of the fuel cell may be appropriately modified according to its purpose. For example, since a large quantity of current is required within a short time for start, sudden acceleration, etc. of automobiles, a fuel cell having high output density is suitable.

According to another embodiment of the invention, the (co)polymer represented by one of the Chemical Formulae 1 to 4 can be applied for various technological fields without limitations. For example, the (co)polymer can be used for all kinds of energy storage and production equipment such as a solar cell, secondary battery, supercapacitor, etc. And, it can be applied for organic electroluminescent device. And, it can be applied for all technological fields using proton conductivity of the copolymer.

According to another embodiment of the invention, provided is a method for preparing polysulfone based copolymer comprising: reacting compounds represented by the following Chemical Formulae 5 to 7 to prepare a compound represented by the following Chemical Formula 8; and, sulfonating the compound represented by the following Chemical Formula 8 to prepare a compound represented by the following Chemical Formula 3:

<Chemical Formula 3>

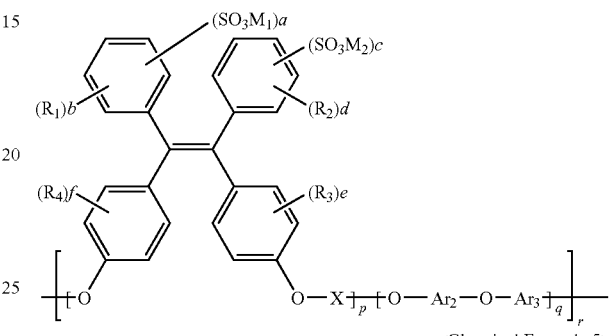

<Chemical Formula 5>

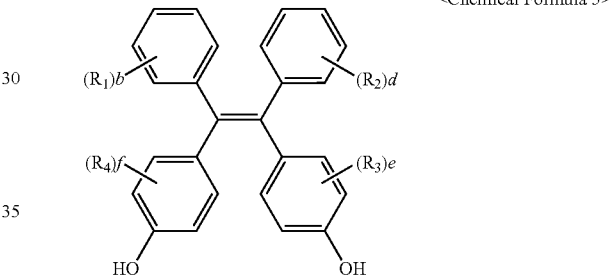

<Chemical Formula 6>

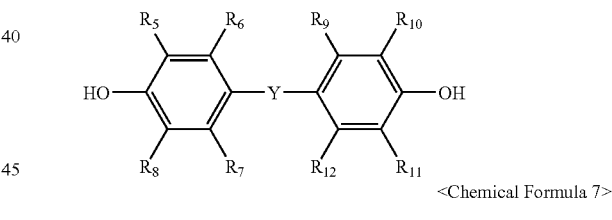

<Chemical Formula 7>

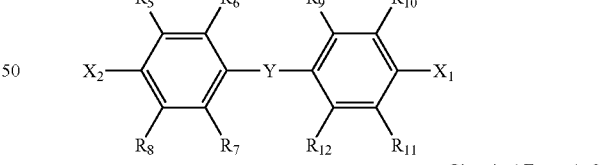

<Chemical Formula 8>

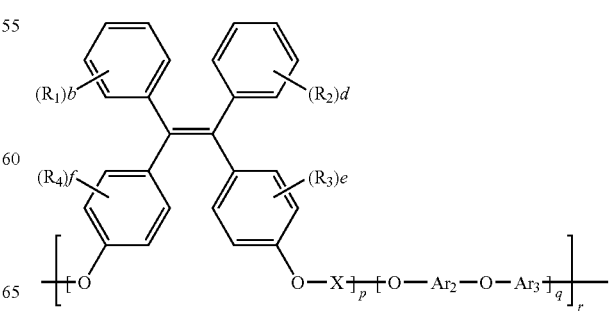

wherein,

X is a single bond or $Ar_1$, $Ar_1$, $Ar_2$ and $Ar_3$ are substituted or unsubstituted C6-20 arylene;

$M_1$ and $M_2$ are independently hydrogen or inorganic cation species such as lithium, sodium, or potassium;

a and c are independently an integer of from 1 to 5;

b and d are independently an integer of from 1 to 4;

a+b=5, c+d=5;

e and f are independently an integer of from 0 to 4, $R_1$, $R_2$, $R_3$ and $R_4$ are independently hydrogen, C1-20 linear or branched alkyl, C2-20 alkenyl, C2-20 alkinyl, C5-20 cycloalkyl, C6-20 aryl, C2-20 heteroaryl, C7-20 alkylaryl, or C1-20 alkoxy;

$R_5$, $R_6$, $R_7$, $R_8$, $R_9$, $R_{10}$, $R_{11}$ and $R_{12}$ are independently hydrogen, halogen atom, —$SO_3M$ (M is hydrogen, or alkali metal or other organic or inorganic cationic species), C1-20 linear or branched alkyl, C2-20 alkenyl, C2-20 alkinyl, C5-20 cycloalkyl, C6-20 aryl, C2-20 heteroaryl, C7-20 alkylaryl, or C1-20 alkoxy group; and, Y is a single bond, S, S(=O)$_2$, C(=O), P(=O)($R_{17}$) or C($R_{18}$)($R_{19}$), and $R_{17}$, $R_{18}$, $R_{19}$ are independently C1-20 alkyl or C6-20 aryl unsubstituted or substituted with halogen.

According to the preparation method, preparation is simple and purification is easy, and yield is high, and thus, the polymer can be prepared at a low cost in large quantities, thus having high economical efficiency. Additionally, it can be easy to control sulfonation degree.

For example, monomers represented by the above Chemical Formulas 5 to 6 and monomers represented by the above Chemical Formula 7 are subjected to nucleophilic substitution reaction to produce copolymer represented by the above Chemical Formula 8. For example, based on 1 mole of the monomer of the above Chemical Formula 5, 0.01 to 20 moles of the monomers of the above Chemical Formula 6 and 0.01 to 20 moles of the monomers of the above Chemical Formula 7 may be polymerized. Subsequently, the copolymer of the above Chemical Formula 8 is sulfonated to obtain copolymer of the above Chemical Formula 3. A sulfonic acid based compound used for the sulfonation may include conc. sulfuric acid (conc. $H_2SO_4$), chlorosulfonic acid ($ClSO_3H$), fuming sulfuric acid (Fuming $SO_3$), fuming sulfuric acid triethylphosphate ($SO_3$.TEP), etc., but any compound capable of sulfonation can be used without limitation. The sulfonation reaction may be conducted at a temperature of 0° C.~100° C., for example, at 25° C.~50° C. Depending on the sulfonation reaction conditions, sulfonation degree of the copolymer of the above Chemical Formula 3 can be controlled. For example, the sulfonation degree of the copolymer of the above Chemical Formula 3 may be 0.01 to 0.99. The sulfonation degree means a ratio of the number of specific repeat unit to which sulfonic acid group is bonded to the total number of specific repeat unit included in the polymer.

The present invention is explained in more detail with reference to the following preferable examples, but the present invention is not limited thereto.

Preparation of Polysulfone Based Polymer

According to the following Reaction Formula 1, polysulfone based copolymer (compound 500) of Examples 1 to 7 was prepared.

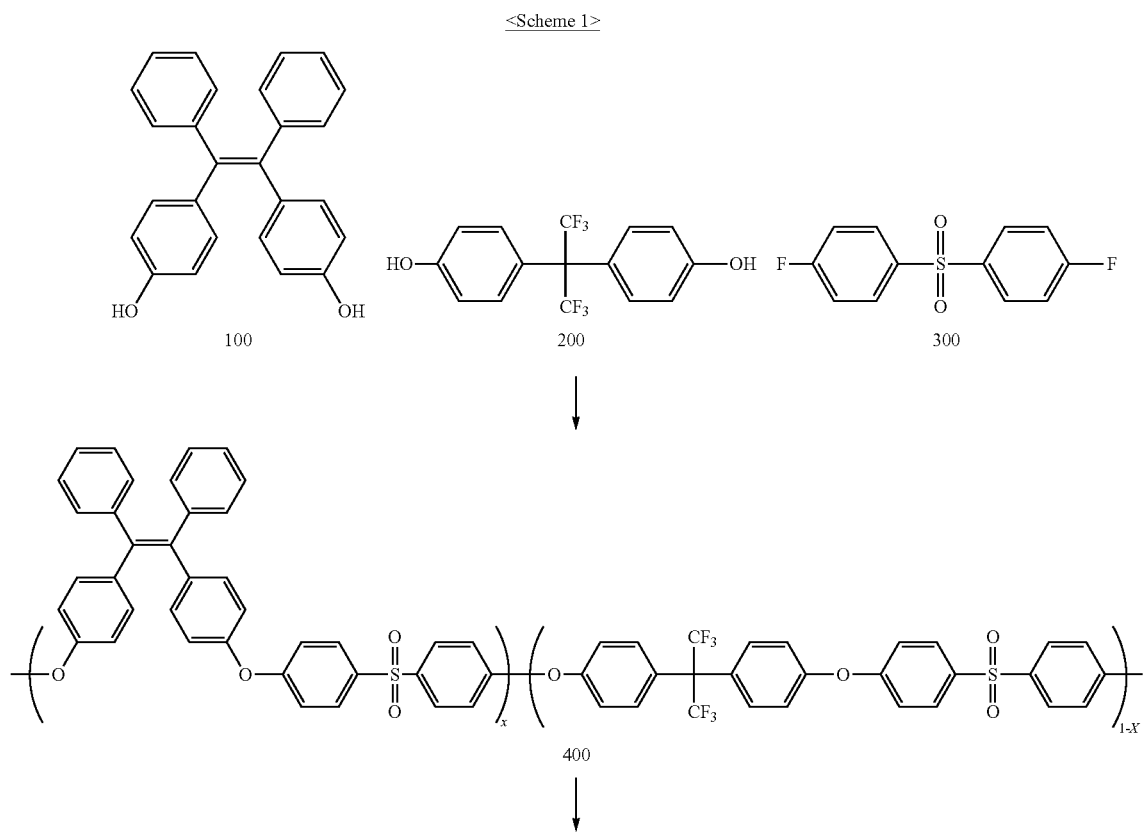

<Scheme 1>

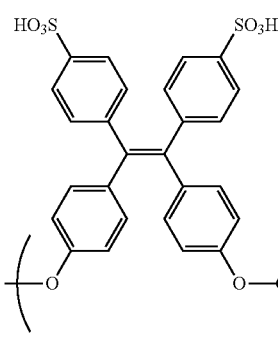

500

EXAMPLE 1 (x=0.4)

Step 1: Nucleophilic Substitution Reaction

A 250 mL 3-neck round bottom flask was equipped with a magnetic stirring rod, a Dean-stark trap and a condenser, and, under nitrogen atmosphere, 8 mmol of 1,2-bis(4-hydroxyphenyl)-1,2-diphenylethylene (compound 100), 12 mmol of 4,4'-(hexafluoroisopropylidene)diphenol (compound 200), 20 mmol of 4,4'-difluorodiphenylsulfone (compound 300) and 70 mL of dimethylacetamide (DMAc) were introduced into the flask and completely dissolved. After the monomers were completely dissolved, potassium carbonate (24 mmol) and toluene (50 L) were introduced and water was removed while refluxing at 120° C. for 4 hours. After removing water, temperature of the reactor was elevated to 140° C. and toluene was removed. After removing toluene, reaction temperature was elevated to 165° C., and then, the mixture was reacted for about 24 hours. After the reaction was completed, the mixture was washed with methanol/water (1:1 v/v) several times, and vacuum dried at 60° C. for 24 hours to obtain a white solid product (compound 400). Yield was 91%. X in the compound 400 was 0.4.

Step 2: Sulfonation Reaction

A 250 mL 3-neck flask was equipped with a dropping funnel, a magnetic stirring rod and a condenser, and, under nitrogen atmosphere, 2.0 mmol of the product obtained in the step 1 (compound 400) and 20 ml of dichloromethane were added and completely dissolved. While refluxing a solution in which the compound 400 is dissolved, a mixed solution of 20 ml of chloromethane and 4.8 mmol of chlorosulfonic acid was slowly added dropwise to the solution over 1 hour. At this time, reaction temperature was room temperature and reaction time was 3 hours. As the reaction proceeded, sulfonated polymer was precipitated. After the reaction, the reaction solution was washed with distilled water several times to remove unreacted chlorosulfonic acid. Subsequently, the precipitate was filtered and vacuum dried at 60° C. for 24 hours. The dried precipitate was dissolved in dimethylacetamide to prepare a solution, and then, 3 wt % of potassium hydroxide aqueous solution was added dropwise, and hydrochloric acid was added to control the pH of the solution to neutral. And then, the product was filtered and vacuum dried to obtain sulfonated copolymer (compound 500). Yield was 92%. X was 0.4.

EXAMPLE 2 (x=0.5)

Step 1: Nucleophilic Substitution Reaction

The compound 400 was prepared by the same method as the Step 1 of the Example 1, except using 10 mmol of 1,2-bis (4-hydroxyphenyl)-1,2-diphenylethylene (compound 100), 10 mmol of 4,4'-(hexafluoroisopropylidene)diphenol (compound 200), and 20 mmol of 4,4'-difluorodiphenylsulfone (compound 300). X in the compound 400 was 0.5. Yield was 91%.

Step 2: Sulfonation Reaction

The compound 500 was prepared by the same method as the Step 2 of the Example 1, except using the product obtained in the Step 1 of the Example 2. X in the compound 500 was 0.5. Yield was 88%.

EXAMPLE 3 (x=0.6)

Step 1: Nucleophilic Substitution Reaction

The compound 400 was prepared by the same method as the Step 1 of the Example 1, except using 12 mmol of 1,2-bis (4-hydroxyphenyl)-1,2-diphenylethylene (compound 100), 8 mmol of 4,4'-(hexafluoroisopropylidene)diphenol (compound 200), and 20 mmol of 4,4'-difluorodiphenylsulfone (compound 300). X in the compound 400 was 0.6. Yield was 91%.

Step 2: Sulfonation Reaction

The compound 500 was prepared by the same method as the Step 2 of the Example 1, except using the product obtained in the Step 1 of the Example 3. X in the compound 500 was 0.6. Yield was 94%.

EXAMPLE 4 (x=0.7)

Step 1: Nucleophilic Substitution Reaction

The compound 400 was prepared by the same method as the Step 1 of the Example 1, except using 14 mmol of 1,2-bis (4-hydroxyphenyl)-1,2-diphenylethylene (compound 100), 6 mmol of 4,4'-(hexafluoroisopropylidene)diphenol (compound 200), and 20 mmol of 4,4'-difluorodiphenylsulfone (compound 300). X in the compound 400 was 0.7. Yield was 92%.

Step 2: Sulfonation Reaction

The compound 500 was prepared by the same method as the Step 2 of the Example 1, except using the product obtained in the Step 1 of the Example 4. X in the compound 500 was 0.7. Yield was 90%.

EXAMPLE 5 (x=0.8)

Step 1: Nucleophilic Substitution Reaction

The compound 400 was prepared by the same method as the Step 1 of the Example 1, except using 16 mmol of 1,2-bis (4-hydroxyphenyl)-1,2-diphenylethylene (compound 100), 4 mmol of 4,4'-(hexafluoroisopropylidene)diphenol (compound 200), and 20 mmol of 4,4'-difluorodiphenylsulfone (compound 300). X in the compound 400 was 0.8. Yield was 95%.

Step 2: Sulfonation Reaction

The compound 500 was prepared by the same method as the Step 2 of the Example 1, except using the product obtained in the Step 1 of the Example 5. X in the compound 500 was 0.8. Yield was 90%.

(Preparation of a Polymer Electrolyte Membrane)

EXAMPLE 6

The polysulfone based copolymer prepared in Example 1 was dissolved in DMSO (dimethyl sulfoxide) and casted on a glass substrate using a flat glass substrate and a round glass rod, and then, dried in a vacuum oven at 150° C. to prepare a polymer electrolyte membrane with a thickness of 50 μm.

EXAMPLE 7

A polymer electrolyte membrane with a thickness of 50 μm was prepared by the same method as Example 6 using the polysulfone based copolymer prepared in Example 2.

EXAMPLE 8

A polymer electrolyte membrane with a thickness of 50 μm was prepared by the same method as Example 6 using the polysulfone based copolymer prepared in Example 3.

EXAMPLE 9

A polymer electrolyte membrane with a thickness of 50 μm was prepared by the same method as Example 6 using the polysulfone based copolymer prepared in Example 4.

EXAMPLE 10

A polymer electrolyte membrane with a thickness of 50 μm was prepared by the same method as Example 6 using the polysulfone based copolymer prepared in Example 5.

COMPARATIVE EXAMPLE 1

Nafion 112 (DuPont) was used as a polymer electrolyte membrane. Nafion 112 was treated in 1M sulfuric acid solution for 24 hours at 100° C. to exchange cation of sulfonate group, sodium, with proton. Subsequently, the hydrogenated copolymer was washed with deionized water.

EVALUATION EXAMPLE 1

Measurement of Proton Conductivity

For the polymer electrolyte membranes of Examples 6 to 10 and Comparative Example 1, proton conductivity was measured. Proton conductivity was measured by interposing the polymer electrolyte membrane between two 2.54 cm² platinum electrodes, and then measuring initial resistance at 30° C. using electrochemical impedance spectroscopy (EIS) with IM6ex (Zahner), and calculating the proton conductivity using the following Equation 1. The results are shown in the following Table 1.

Proton conductivity[S/cm]= (membrane thickness[cm]/ membrane area[cm²])×initial conductivity[S]   <Equation 1>

EVALUATION EXAMPLE 2

Measurement of Ethanol Permeability

The polymer electrolyte membranes of Examples 6 to 10 were respectively interposed between two cells, and, 15 mL of 1M methanol aqueous solution was injected into one cell and 15 mL of distilled water was injected into another cell, and then, sample was fractioned 10 μl per 10 minutes from the cell containing distilled water and the cell was filled again with 10 μl of distilled water. On the side of the cell adjacent to the polymer electrolyte membrane, fine pores exist, and thus, solvent can be moved. Methanol concentration of the fractioned sample was measured with gas chromatography. And, change in methanol concentration according to time elapse was described as a graph, and methanol permeability was calculated from the gradient using the following Equation 2. The results are shown in the following Table 1.

Methanol permeability[cm²/S]=(gradient[ppm/s]× solution volume×thickness of electrolyte membrane)/ (area of electrolyte membrane× methanol concentration)   <Equation 2> wherein, diameter of membrane (thickness 0.05 μm) 3 cm; methanol concentration 1 mol/L (32000 ppm); solution volume 15 ml; membrane area 7.06 cm²

TABLE 1

|  | Proton conductivity[S/cm] | Methanol permeability[cm²/S] |
| --- | --- | --- |
| Example 6 | $1.0 \times 10^{-3}$ | $4.1 \times 10^{-7}$ |
| Example 7 | $1.8 \times 10^{-3}$ | $4.9 \times 10^{-7}$ |
| Example 8 | $3.2 \times 10^{-3}$ | $5.6 \times 10^{-7}$ |
| Example 9 | $3.5 \times 10^{-3}$ | $6.2 \times 10^{-7}$ |
| Example 10 | $4.1 \times 10^{-3}$ | $7.8 \times 10^{-7}$ |
| Comparative Example 1 | $3.5 \times 10^{-3}$ | $21.0 \times 10^{-7}$ |

As shown in the Table 1, the polymer electrolyte membranes of Example 6 to 10 comprising polysulfone based polymer according to one embodiment of the invention exhibit remarkably low methanol permeability compared to Comparative Example 1, while showing similar proton conductivity to Comparative Example 1.

What is claimed is:

1. A polymer comprising a repeat unit represented by the following Chemical Formula 1:

<Chemical Formula 1>

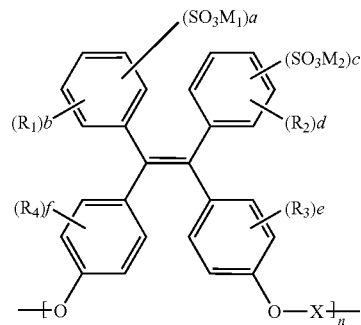

Wherein,

X is $Ar_1$, and $Ar_1$ is substituted or unsubstituted C6-20 arylene group;

$M_1$ and $M_2$ are independently hydrogen or inorganic cation;

a+b=5, c+d=5, a and c are independently an integer of from 1 to 5;

e and f are independently an integer of from 0 to 4;

$R_1$, $R_2$, $R_3$ and $R_4$ are independently hydrogen, C1-20 linear or branched alkyl, C2-20 alkenyl, C2-20 alkynyl, C5-20 cycloalkyl, C6-20 aryl, C2-20 heteroaryl, C7-20 alkylaryl, or C1-20 alkoxy group; and, n, which is a polymerization degree, is 10 to 10,000, wherein the polymer is obtained by using chlorosulfonic acid in a sulfonation reaction, and wherein the polymer is included in a polymer electrolyte membrane of a fuel cell.

2. The polymer according to claim 1, wherein the polymer is a copolymer further comprising a repeat unit represented by the following Chemical Formula 2:

<Chemical Formula 2>

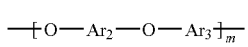

wherein, $Ar_2$ and $Ar_3$ are independently substituted or unsubstituted C6-20 arylene group; and m, which is a polymerization degree, is 10 to 10,000.

3. The polymer according to claim 1, wherein the polymer is a copolymer comprising a repeat unit represented by the following Chemical Formula 3:

<Chemical Formula 3>

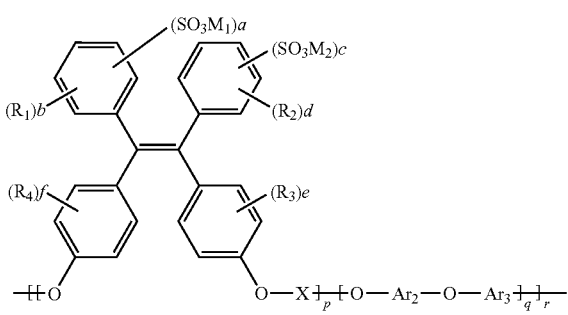

wherein,

X, $M_1$, $M_2$, $R_1$, $R_2$, $R_3$, $R_4$, a, b, c, d, e, f are as defined in claim 1, $Ar_2$ and $Ar_3$ are independently substituted or unsubstituted C6-20 arylene group;

p and q are mole fraction, and p+q=1, 0<p<1, 0<q<1, and r, which is a polymerization degree, is 10 to 10000.

4. The polymer according to claim 1, wherein the substituted or unsubstituted C6-20 arylene group is represented by one of the following Chemical Formulae:

<Chemical Formula 1a>

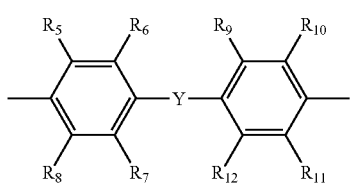

<Chemical Formula 1b>

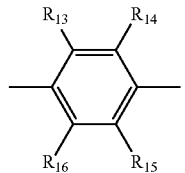

wherein, $R_5$, $R_6$, $R_7$, $R_8$, $R_9$, $R_{10}$, $R_{11}$, $R_{12}$, $R_{13}$, $R_{14}$, $R_{15}$ and $R_{16}$ are independently hydrogen, halogen atom, C1-20 linear or branched alkyl, C2-20 alkenyl, C2-20 alkynyl, C5-20 cycloalkyl, C6-20 aryl, C2-20 heteroaryl, C7-20 alkylaryl, or C1-20 alkoxy group; and, Y is a single bond, S, S($=$O)$_2$, C($=$O), P($=$O)($R_{17}$) or C($R_{18}$)($R_{19}$), and $R_{17}$, $R_{18}$, $R_{19}$ are independently C1-20 alkyl or C6-20 aryl group unsubstituted or substituted with halogen.

5. The polymer according to claim 1, wherein the polymer is a copolymer comprising a repeat unit represented by the following Chemical Formula 4:

<Chemical Formula 4>

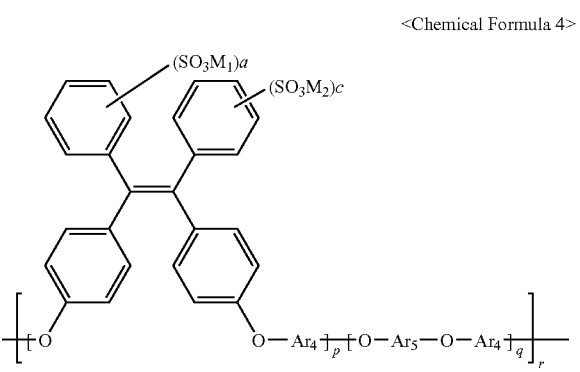

Wherein,

X, $M_1$, $M_2$, a, and c are as defined in claim 1, $Ar_4$ and $Ar_5$ are independently substituted or unsubstituted C6-20 arylene group;

p and q are mole fractions, and p+q=1, 0<p<1, 0<q<1; and, r, which is a polymerization degree, is 10 to 10000.

6. The polymer according to claim 5, wherein $Ar_4$ or $Ar_5$ is C6-20 arylene group represented by one of the following Chemical Formulae:

<Chemical Formula 4a>

<Chemical Formula 4b>

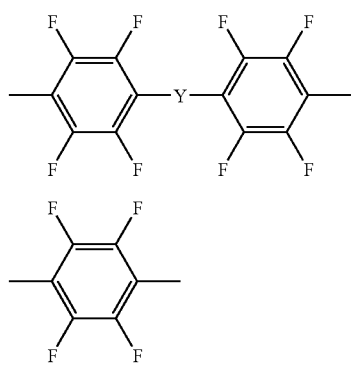

-continued

<Chemical Formula 4c>

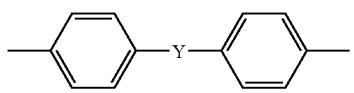

<Chemical Formula 4d>

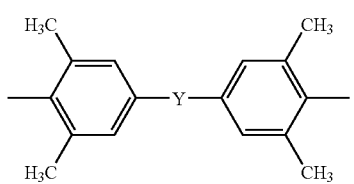

wherein,

Y is a single bond, S, S(=O)$_2$, C(=O), P(=O)(R$_{17}$) or C(R$_{18}$)(R$_{19}$), and R$_{17}$, R$_{18}$, R$_{19}$ are independently C1-20 alkyl or C6-20 aryl group unsubstituted or substituted with halogen group.

7. The polymer according to claim 1, wherein the ratio of p:q is 1:9 to 9:1.

8. The polymer according to claim 1, wherein the polymer has weight average molecular weight of 1000 to 500000.

9. The polymer according to claim 3, wherein the polymer is random copolymer or block copolymer.

10. A polymer electrolyte membrane comprising the copolymer according to claim 1.

11. The polymer electrolyte membrane according to claim 10, wherein the electrolyte membrane further comprises one or more polymers selected from the group consisting of polyimide, polyetherketone, polysulfone, polyethersulfone, polyetherethersulfone, polybenzimidazole, polyphenylene oxide, polyphenylene sulfide, polystyrene, polytrifluorostyrene sulfonic acid, polystyrene sulfonic acid, polyurethane and branched sulfonated polysulfoneketone copolymer.

12. The polymer electrolyte membrane according to claim 10, wherein the electrolyte further comprises one or more inorganic substances selected from the group consisting of silicon oxide(SiO$_2$), titanium oxide(TiO$_2$), inorganic phosphoric acid, sulfonated silicon oxide(sulfonated SiO$_2$), sulfonated zirconium oxide(sufonated ZrO) and sulfonated zirconium phosphate(sulfonated ZrP).

13. The polymer electrolyte membrane according to claim 10, wherein the electrolyte membrane further comprises a porous support.

14. A membrane-electrode assembly comprising the polymer electrolyte membrane of claim 10.

15. A fuel cell comprising the polymer electrolyte membrane of claim 10.

16. The fuel cell according to claim 15, wherein the fuel cell is a direct methanol fuel cell.

17. The fuel cell according to claim 15, wherein the fuel cell is a fuel cell for vehicle.

18. A vehicle comprising a fuel cell of claim 15.

19. A method for preparing polysulfone based copolymer comprising:

reacting compounds represented by the following Chemical Formulae 5 to 7 to prepare a compound represented by the following Chemical Formula 8; and sulfonating the compound by using chlorosulfonic acid in a sulfonation reaction represented by the following Chemical Formula 8 to prepare a compound represented by the following Chemical Formula 3:

<Chemical Formula 3>

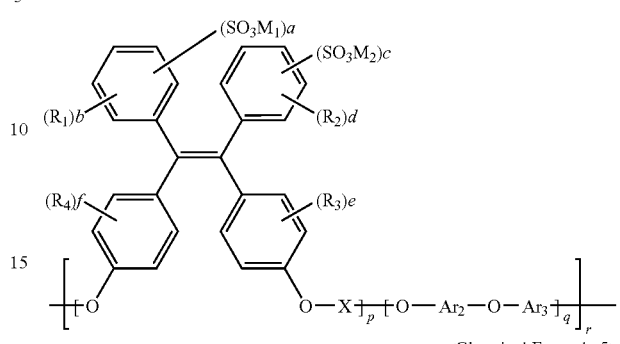

<Chemical Formula 5>

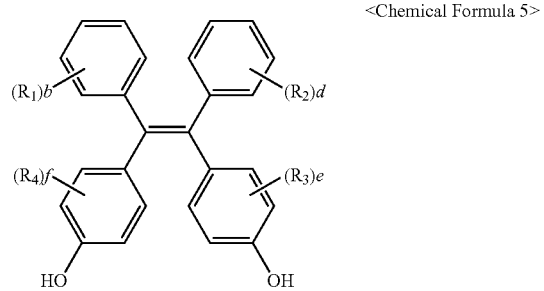

<Chemical Formula 6>

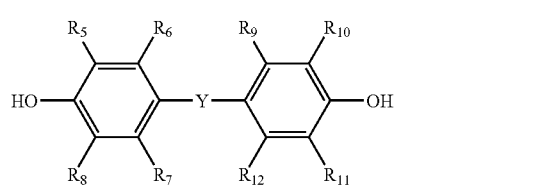

<Chemical Formula 7>

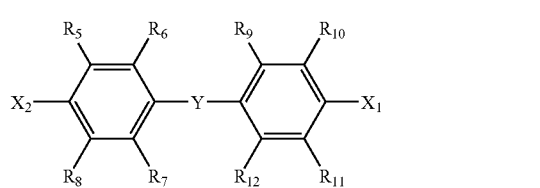

<Chemical Formula 8>

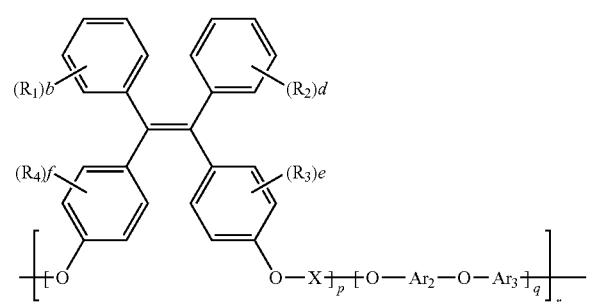

wherein,

X is a single bond or Ar$_1$,

Ar$_1$, Ar$_2$ and Ar$_3$ are substituted or unsubstituted C6-20 arylene;

M$_1$ and M$_2$ are independently hydrogen, lithium, sodium, or potassium;

a and c are independently an integer of from 1 to 5;

b and d are independently an integer of from 1 to 4;

a+b=5, c+d=5;

e and f are independently an integer of from 0 to 4, $R_1$, $R_2$, $R_3$ and $R_4$ are indepdently C1-20 linear or branched alkyl, C2-20 alkenyl, C2-20 alkynyl, C5-20 cycloalkyl, C6-20 aryl, C2-20 heteroaryl, C7-20 alkylaryl, or C1-20 alkoxy;

$R_5$, $R_6$, $R_7$, $R_8$, $R_9$, $R_{10}$, $R_{11}$ and $R_{12}$ are independently hydrogen, halogen atom, —$SO_3M$(M is hydrogen, or alkali metal), C1-20 linear or branched alkyl, C2-20 alkenyl, C2-20 alkynyl, C5-20 cycloalkyl, C6-20 aryl, C2-20 heteroaryl, C7-20 alkylaryl, or C1-20 alkoxy group; and, Y is a single bond, S, S(=O)$_2$, C(=O), P(=O)($R_{17}$) or C($R_{18}$)($R_{19}$), and $R_{17}$, $R_{18}$, $R_{19}$ are independently C1-20 alkyl or C6-20 aryl unsubstituted or substituted with halogen.

20. A polymer comprising a repeat unit represented by the following Chemical Formula 1:

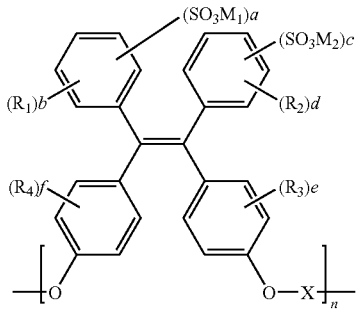

<Chemical Formula 1> wherein,

X is $Ar_1$, and $Ar_1$ is substituted or unsubstituted C6-20 arylene group;

$M_1$ and $M_2$ are independently hydrogen or inorganic cation;

a+b=5, c+d=5, a and c are independently an integer of from 1 to 5;

e and f are independently an integer of from 0 to 4;

$R_1$, $R_2$, $R_3$ and $R_4$ are independently hydrogen, substituted C1-20 linear or branched alkyl, substituted C2-20 alkenyl, substituted C2-20 alkynyl, substituted C5-20 cycloalkyl, substituted C6-20 aryl, substituted C2-20 heteroaryl, substituted C7-20 alkylaryl, or substituted C1-20 alkoxy group; and, n, which is a polymerization degree, is 10 to 10,000, wherein the polymer is obtained by using chlorosulfonic acid in a sulfonation reaction, and wherein the polymer is included in a polymer electrolyte membrane of a fuel cell.

21. The polymer according to claim 2, wherein the substituted or unsubstituted C6-20 arylene group is represented by one of the following Chemical Formulae:

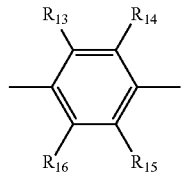

<Chemical Formula 1a>

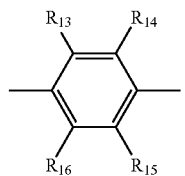

<Chemical Formula 1b> wherein, $R_5$, $R_6$, $R_7$, $R_8$, $R_9$, $R_{10}$, $R_{11}$, $R_{12}$, $R_{13}$, $R_{14}$, $R_{15}$ and $R_{16}$ are independently hydrogen, halogen atom, C1-20 linear or branched alkyl, C2-20 alkenyl, C2-20 alkynyl, C5-20 cycloalkyl, C6-20 aryl, C2-20 heteroaryl, C7-20 alkylaryl, or C1-20 alkoxy group; and, Y is a single bond, S, S(=O)$_2$, C(=O), P(=O)($R_{17}$) or C($R_{18}$)($R_{19}$), and $R_{17}$, $R_{18}$, $R_{19}$ are independently C1-20 alkyl or C6-20 aryl group unsubstituted or substituted with halogen.

22. The polymer according to claim 3, wherein the substituted or unsubstituted C6-20 arylene group is represented by one of the following Chemical Formulae:

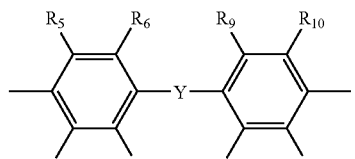

<Chemical Formula 1a>

<Chemical Formula 1b> wherein, $R_5$, $R_6$, $R_7$, $R_8$, $R_9$, $R_{10}$, $R_{11}$, $R_{12}$, $R_{13}$, $R_{14}$, $R_{15}$ and $R_{16}$ are independently hydrogen, halogen atom, C1-20 linear or branched alkyl, C2-20 alkenyl, C2-20 alkynyl, C5-20 cycloalkyl, C6-20 aryl, C2-20 heteroaryl, C7-20 alkylaryl, or C1-20 alkoxy group; and, Y is a single bond, S, S(=O)$_2$, C(=O), P(=O)($R_{17}$) or C($R_{18}$)($R_{19}$), and $R_{17}$, $R_{18}$, $R_{19}$ are independently C1-20 alkyl or C6-20 aryl group unsubstituted or substituted with halogen.

23. The polymer according to claim 20, wherein the polymer is a copolymer further comprising a repeat unit represented by the following Chemical Formula 2:

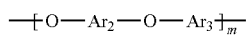

<Chemical Formula 2> wherein, $Ar_2$ and $Ar_3$ are independently substituted or unsubstituted C6-20 arylene group; and m, which is a polymerization degree, is 10 to 10,000.

24. The polymer according to claim 20, wherein the polymer is a copolymer comprising a repeat unit represented by the following Chemical Formula 3:

<Chemical Formula 3>

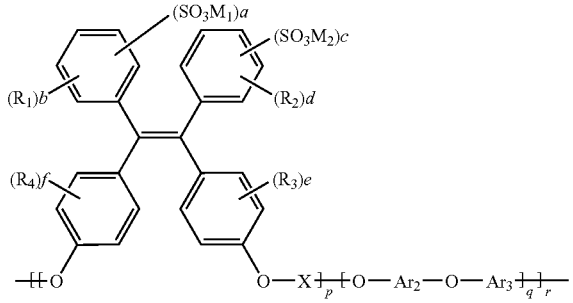

wherein,

X, $M_1$, $M_2$, $R_1$, $R_2$, $R_3$, $R_4$, a, b, c, d, e, f are as defined in claim 1, $Ar_2$ and $Ar_3$ are independently substituted or unsubstituted C6-20 arylene group;

p and q are mole fraction, and p+q=1, 0<p<1, 0<q<1, and r, which is a polymerization degree, is 10 to 10000.

25. The polymer according to claim 20, wherein the substituted or unsubstituted C6-20 arylene group is represented by one of the following Chemical Formulae:

<Chemical Formula 1a>

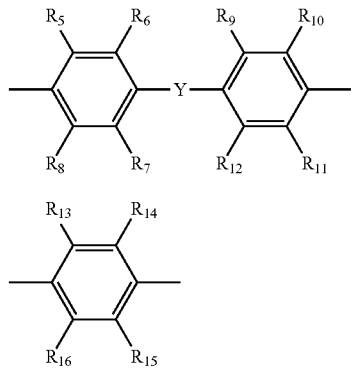

<Chemical Formula 1b>

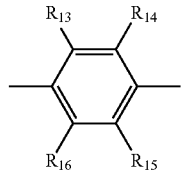

wherein, $R_5$, $R_6$, $R_7$, $R_8$, $R_9$, $R_{10}$, $R_{11}$, $R_{12}$, $R_{13}$, $R_{14}$, $R_{15}$ and $R_{16}$ are independently hydrogen, halogen atom, C1-20 linear or branched alkyl, C2-20 alkenyl, C2-20 alkynyl, C5-20 cycloalkyl, C6-20 aryl, C2-20 heteroaryl, C7-20 alkylaryl, or C1-20 alkoxy group; and, Y is a single bond, S, S(=O)$_2$, C(=O), P(=O)($R_{17}$) or C($R_{18}$)($R_{19}$), and $R_{17}$, $R_{18}$, $R_{19}$ are independently C1-20 alkyl or C6-20 aryl group unsubstituted or substituted with halogen.

26. A polymer electrolyte membrane comprising the copolymer according to claim 20.

27. A fuel cell comprising the polymer electrolyte membrane of claim 26.

* * * * *